United States Patent [19]
Buzsaki et al.

[11] Patent Number: 5,915,086
[45] Date of Patent: Jun. 22, 1999

[54] HIERARCHICAL PROTECTION OF SEED DATA

[75] Inventors: George Buzsaki, Fremont; Clifford Godwin, San Francisco, both of Calif.

[73] Assignee: Oracle Corporation, Redwood Shores, Calif.

[21] Appl. No.: 08/832,232

[22] Filed: Apr. 3, 1997

[51] Int. Cl.[6] .................................................. G06F 11/00
[52] U.S. Cl. ............................................................ 395/186
[58] Field of Search .............................. 395/186, 188.01, 395/653; 380/4, 23, 25; 707/9

[56] References Cited

U.S. PATENT DOCUMENTS

| | | | |
|---|---|---|---|
| 5,276,901 | 1/1994 | Howell et al. | 395/800 |
| 5,414,844 | 5/1995 | Wang | 395/186 |
| 5,499,295 | 3/1996 | Cooper | 380/23 |
| 5,781,793 | 7/1998 | Larvoire et al. | 395/188.01 |
| 5,784,577 | 7/1998 | Jacobson et al. | 395/284 |

*Primary Examiner*—Robert W. Beausoliel, Jr.
*Assistant Examiner*—Scott T. Baderman
*Attorney, Agent, or Firm*—Blakely, Sokoloff, Taylor & Zafman LLP

[57] ABSTRACT

A method for protecting seed data according to an access hierarchy is disclosed. A seed data entity is resolved into a plurality of seed data units each having an associated protection level and customization level. When a request to modify a seed data unit is received, an access level is determined for the request. The seed data is modified in accordance with the request if the access level determined for the request is superior or equal to the protection level of the seed data unit and inferior or equal to the customization level of the seed data unit. If the seed data is modified or replaced, the access level determined for the request is assigned to the customization level of the seed data unit.

20 Claims, 7 Drawing Sheets

| USER ACCESS LEVEL : 0 | | | 300 |
|---|---|---|---|
| ACTIVITY | PROTECTION LEVEL | CUSTOMIZATION LEVEL | |
| CanRequestorApprove | 10 | 0 | |
| SelectApprover | Infinity | 0 | |
| RequestApproval | 0 | 0 | |

FIG. 3

| USER ACCESS LEVEL : 10 | | | 400 |
|---|---|---|---|
| ACTIVITY | PROTECTION LEVEL | CUSTOMIZATION LEVEL | |
| CanRequestorApprove | 100 | 10 | |
| SelectApprover | 10 | 10 | |
| RequestApproval | 0 | 0 | |

FIG. 4

| USER ACCESS LEVEL : 100 | | | 500 |
|---|---|---|---|
| ACTIVITY | PROTECTION LEVEL | CUSTOMIZATION LEVEL | |
| CanRequestorApprove | 100 | 100 | |
| SelectApprover | 10 | 10 | |
| RequestApproval | 0 | 0 | |

FIG. 5

| UPGRADE ACCESS LEVEL: 0 | | | 605 |
|---|---|---|---|
| ACTIVITY | PROTECTION LEVEL | CUSTOMIZATION LEVEL | |
| CanRequestorApprove | 10 | 0 | |
| SelectApprover | Infinity | 0 | |
| RequestApproval | 10 | 0 | |
| VerifyApproval | 100 | 0 | |

| ACTIVITY | PROTECTION LEVEL | CUSTOMIZATION LEVEL | 630 |
|---|---|---|---|
| CanRequestorApprove | 100 | 100 | |
| SelectApprover | 10 | 10 | |
| RequestApproval | 0 | 0 | |

| ACTIVITY | PROTECTION LEVEL | CUSTOMIZATION LEVEL | 650 |
|---|---|---|---|
| CanRequestorApprove | 100 | 100 | |
| SelectApprover | 10 | 10 | |
| RequestApproval | 10 | 0 | |
| VerifyApproval | 100 | 0 | |

FIG. 6

HIERARCHICAL PROTECTION OF SEED DATA

BACKGROUND OF THE INVENTION (1). Field of the Invention

The present invention relates to the field of computer science. More specifically, the present invention relates to modification of data used to configure execution of a computer program.

(2). Art Background

The run-time operation of many computer programs is controlled by user-modifiable program information called "seed data". Seed data is configuration data read during program execution to enable selected program options and, in some cases, to provide an initial set of program data. By modifying seed data, users can upgrade or customize computer programs without having to change program code. The use of seed data is beneficial to both program users and developers. Users can tailor computer programs according to their individual needs, and developers can support various program options without having to provide multiple program versions.

Seed data is typically stored in a relational database or a flat file (e.g., a text or binary file on a local or network disk drive) that can be accessed when program execution begins or later if prompted by a user. In the case of a text-based file, the user can modify seed data with a simple text editor. When seed data is stored in a binary file or in a relational database, a tool is usually provided for inspecting and modifying the seed data.

Despite the benefits of using seed data, there are a number of drawbacks to the way that seed data has traditionally been managed. First, traditional techniques for accessing seed data do not distinguish between different categories of data within an overall set of seed data. It is often desirable to limit access to selected data values of an overall set of seed data so that the selected data values can be modified only by authorized individuals, while other seed data values may be freely modified. However, using the traditional approach, access to seed data is wide open with no provision for limiting access to selected seed data values.

Another problem with the traditional seed data approach is that valid end-user customizations are not preserved during seed data upgrades. During upgrade operations, seed data stored in a flat file or database is often overwritten with new seed data, forcing the user to restore previously entered customization values after the upgrade has been completed. This can be time consuming. In the context of an enterprise-wide upgrade, where end-user seed data customizations must be restored on hundreds or even thousands of machines, the cost of restoring lost seed data can easily outweigh the benefit of the program upgrade.

Another drawback to the traditional seed data approach is that hierarchical protection of seed data is not supported. As a result, seed data customizations can be protected by only one party in a software delivery path; usually the software developer. To appreciate why this is inadequate, consider the following hypothetical software delivery path. A management information systems (MIS) department of an enterprise purchases a computer program and associated seed data from a software developer. For this step in the software delivery path, the software developer is the seed data supplier and the MIS department is the seed data consumer. The MIS department may or may not be able to customize the seed data, depending on whether the developer has protected the seed data from customization. Assume that the seed data is customizable and that the MIS department customizes the seed data according to enterprise needs, then delivers the computer program and customized seed data to a number of customers within the enterprise (e.g., accounting, engineering, sales, etc.). For this step in the software delivery path, the MIS department is the seed data supplier and the enterprise customers are the seed data consumers. Since the MIS department was not able to protect its customizations, each of the enterprise customers is able to overwrite the MIS customizations with their own customizations. This is undesirable, since the MIS-entered customizations may have ensured operational compatibility between the various enterprise customers or served some similar purpose unknown to the enterprise customers. To state the problem generally, without hierarchical protection of seed data, seed data suppliers cannot prevent their seed data customizations from being overwritten by seed data consumers.

It would be desirable to protect seed data according to an access hierarchy so that selected seed data can be protected from modification by seed data consumers and so that valid seed data customizations entered by seed data consumers can be preserved during seed data upgrades.

BRIEF SUMMARY OF THE INVENTION

A method for protecting seed data according to an access hierarchy is disclosed. A seed data entity such as a flat file or relational database table is resolved into protectable seed data units having a granularity as fine as a single seed data value. A protection level and a customization level is associated with each seed data unit. When a request to modify seed data is received, an access level is determined for the modification request. The access level is compared against the protection level and the customization level of the seed data unit sought to be modified. If the access level is superior or equal to the seed data protection level and inferior or equal to the seed data customization level, the seed data unit is modified according to the request. When the seed data unit is modified, the access level associated with the modification request is assigned to the customization level of the seed data unit. If the access level associated with the seed data request is not superior or equal to the protection level of the seed data unit sought to be modified, or if the access level is not inferior or equal to the customization level of the seed data unit sought to be modified, the request to modify the seed data unit is rejected.

By assigning access levels according to a seed data supplier/consumer hierarchy, seed data suppliers can protect selected seed data from modification by seed data consumers. Also, when a seed data supplier provides upgraded seed data to a seed data consumer, the access level of the upgrade supplier can be compared against customization levels of seed data units. If a seed data unit has been modified by a seed data consumer, the customization level will reflect that fact and the access level of an upgrade supplier will not be inferior or equal to the customization level. Consequently, the seed data customization entered by the seed data consumer will not be overwritten in the upgrade process.

BRIEF DESCRIPTION OF THE DRAWINGS

The features and advantages of the present invention will be more fully understood by reference to the accompanying drawing, in which:

FIG. 3 depicts a seed data protection level table generated by a user operating at access level zero.

FIG. 4 depicts the seed data protection level table of FIG. 3 after customization by a user operating at access level ten.

FIG. 5 depicts the seed data protection level table of FIG. 4 after customization by a user operating at access level one-hundred.

FIG. 6 illustrates the result of an upgrade operation performed on the seed data protection table of FIG. 5.

DETAILED DESCRIPTION OF THE INVENTION

A method for protecting seed data according to an access hierarchy is described below. Although numerous specific details are set forth in order to provide a thorough understanding of the present invention, it will be apparent to one skilled in the art that the present invention may be practiced without such specific details. For example, much of the following description involves upgrading seed data used to configure a computer program for automating workflows. It will be readily appreciated, however, that seed data used to configure other types of computer programs may be protected using the method of the present invention.

Exemplary Software Delivery Path

Figure 1:
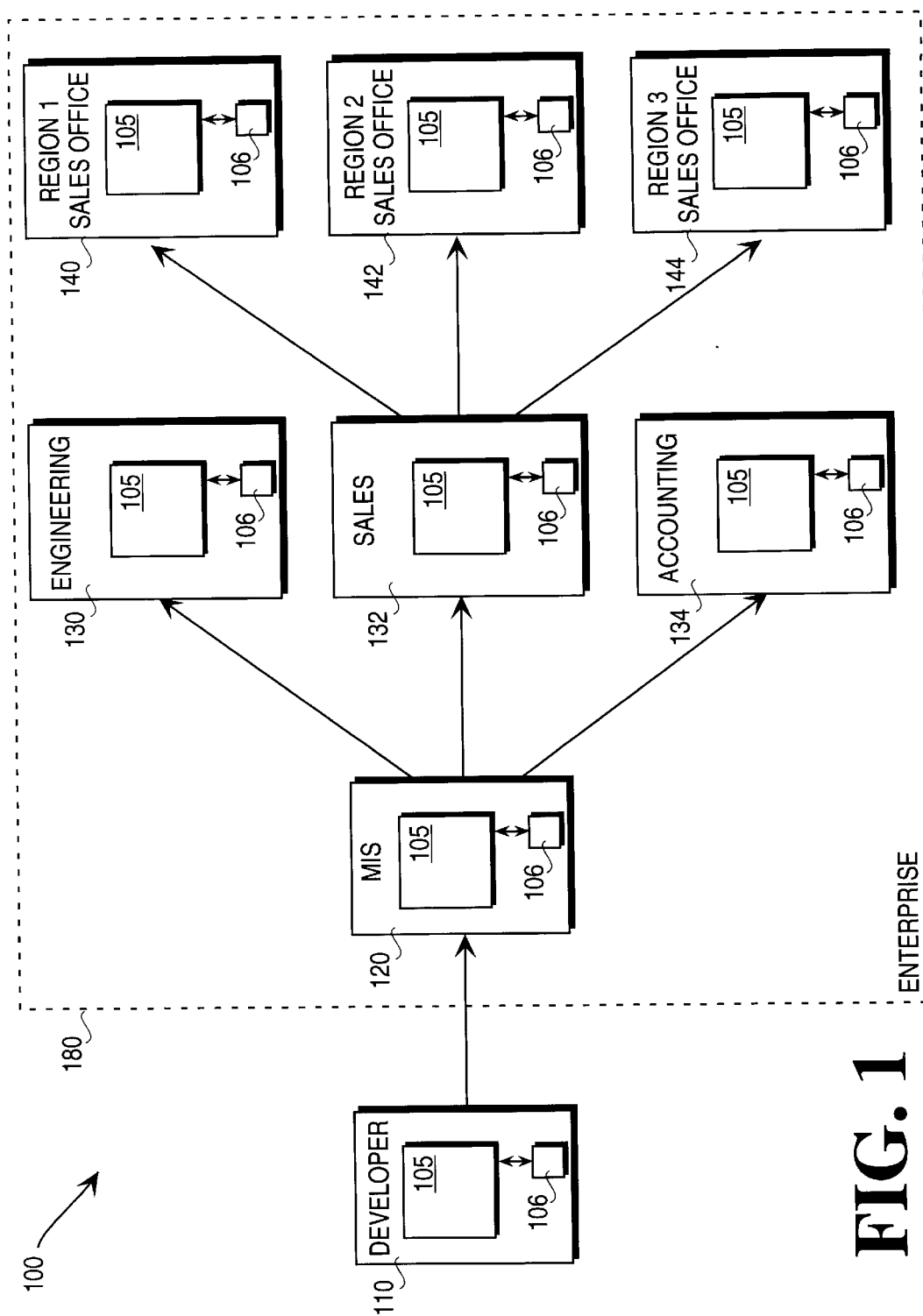
FIG. 1 illustrates a software delivery path.

FIG. 1 illustrates a software delivery path 100 for a computer program 105 and its accompanying seed data 106. A software developer 110 produces the computer program 105 and also produces an initial set of seed data 106. The seed data 106 is used to configure the execution of the computer program 105, for example by defining activities to be carried out when the program 105 is executed or by specifying optional execution paths. The seed data 106 may be maintained in a flat file or in a relational database, but typically is delivered to a consumer in flat file form either by download via a computer network or encoded onto a computer-readable medium such as a magnetic or optical diskette.

Dashed box 180 represents an enterprise which purchases the computer program 105 from the developer 110. As shown in FIG. 1, the computer program 105 is first received in the enterprise MIS (management information systems) department 120. For this first step in the software delivery path 100, the software developer 110 is a seed data supplier and the enterprise MIS department 120 is a seed data consumer. Since a primary purpose for using seed data is to enable a consumer to tailor execution of the corresponding computer program, the seed data consumer, in this case the enterprise MIS department 120, will usually want to modify the seed data 106 according to the consumer's needs.

After modifying the seed data 106, the enterprise MIS department delivers the computer program 105 and modified seed data 106 to a number of enterprise customers, shown in FIG. 1 to be an engineering department 130, sales department 132 and accounting department 134. For this second step in the software delivery path 100, the MIS department 120 is the seed data supplier and the enterprise customers (130, 132, 134) are the seed data consumers. Note that the computer program 105 delivered to each enterprise customer is the same computer program originally delivered to the enterprise MIS department 120 by the software developer 110. Only the seed data 106 has been modified. As stated above, the customers of the enterprise MIS department 120 may want to further modify the seed data 106 before delivering the computer program 105 and seed data 106 to other entities within the enterprise. As shown in FIG. 1, for example, the sales department 132 delivers the computer program 105 and associated seed data 106 to three different regional sales offices (140, 142, 144). The three regional sales offices (140, 142, 144) may want to make further modifications to the seed data 106.

One example of a computer program that uses seed data is a workflow program, such as Oracle Workflow™ from Oracle™ Corporation located in Redwood Shores, California. Oracle and Oracle Workflow are trademarks of Oracle Corporation. A workflow program is used to automate procedures, called workflows, that involve routing various types of information between individuals according to user-specified rules. The user-specified rules can be set forth in seed data so that vendor-supplied workflow definitions can be tailored by users according to their needs and, if desired, users can develop their own workflow definitions. Oracle Workflow includes a workflow engine to execute the user supplied workflow definitions when prompted.

As discussed above, once program configuration information, like a workflow definition, has been set forth in seed data, the seed data supplier may want to protect all or part of the seed data from modification by a seed data consumer. Likewise, the seed data consumer may want to modify portions of the seed data and then protect all or part of the modifications from further modification by a subsequent seed data consumer. Also, the seed data consumer may want to preserve valid seed data modifications when a seed data upgrade is received from the seed data supplier. To appreciate how this is accomplished in the present invention, it is helpful to introduce an exemplary workflow that can be defined using seed data.

Workflow Diagram

Figure 2:
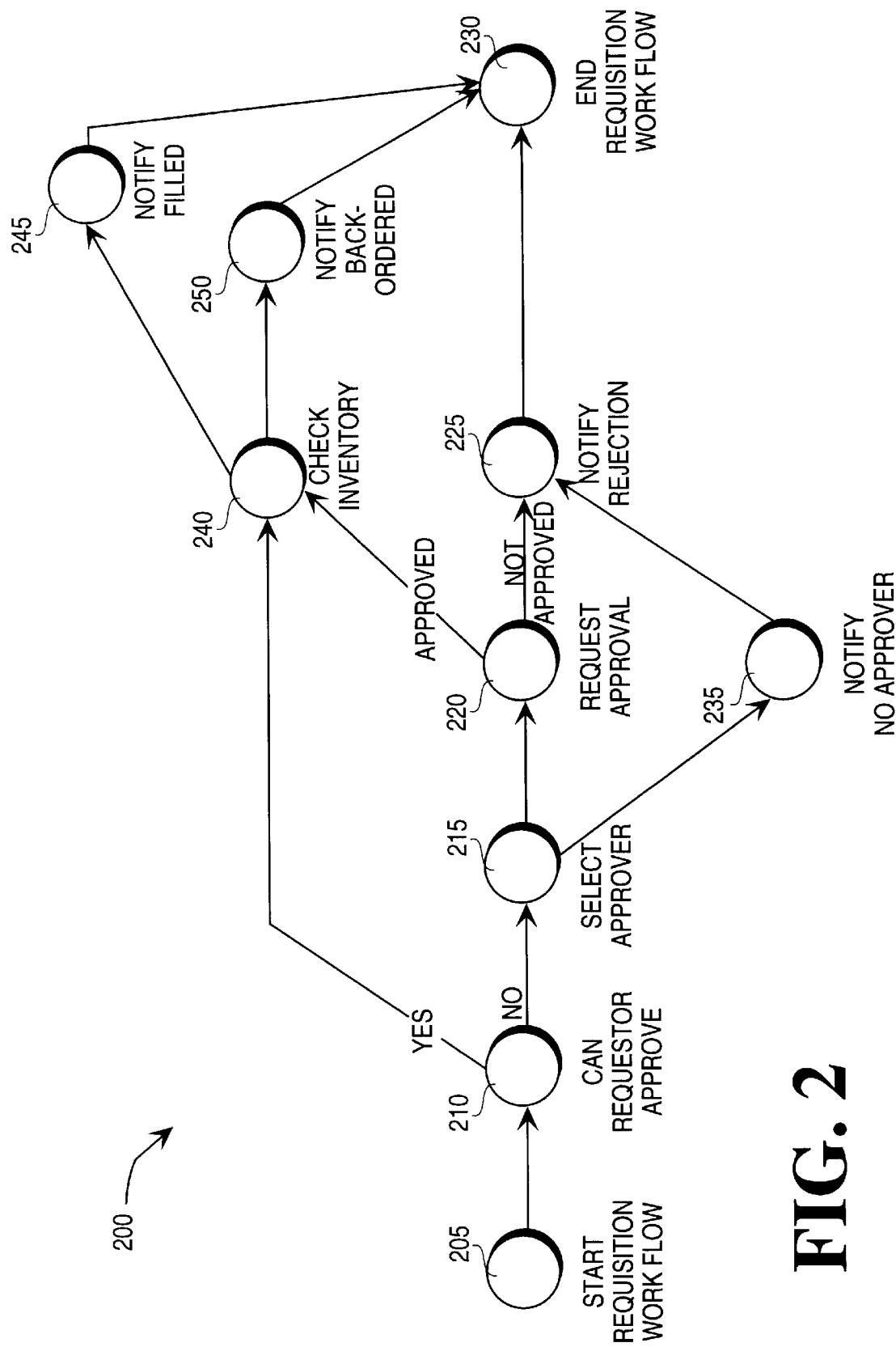
FIG. 2 depicts a workflow.

FIG. 2 is a diagram illustrating a workflow 200 for processing a requistion. Like all workflows, the requisition workflow is made up of activities and transitions between activities. The activities indicate operations to be performed by the program executing the workflow and the transitions indicate the conditional and non-conditional branches to be taken after an activity has been completed. A non-conditional branch is followed after every execution of its preceding activity, while a conditional branch is followed only if a condition (usually established by execution of the preceding activity) is satisfied.

The workflow 200 illustrated in FIG. 2 begins with a start activity 205 called "StartRequisitionWorkflow". A start activity is essentially a place holder indicating to the workflow program where to find the starting activity for a named workflow. The StartRequisitionWorkflow activity 205 transitions to an activity called "CanRequestorApprove" 210. The CanRequestorApprove activity 210 is used to determine whether the requestor can self-approve the requisitioned item. If so, the workflow transitions to the "CheckInventory" activity 240 and if not, the workflow transitions to the "SelectApprover" 215 activity. At the SelectApprover activity 215, an attempt to identify an approver is made. If an approver is identified, execution of the workflow transitions to the RequestApproval activity 220 where an approver is notified and requested to supply input either approving or rejecting the requisition. If the requisition is approved, workflow execution transitions to the CheckInventory activity 240. If the requisition is not approved, the workflow transitions to a NotifyRejection activity 225 to notify the requester that the requisition has been rejected. Also, if, at the SelectApprover activity 215, no approver is identified, the workflow transitions to a NotifyNoApprover activity 235 to notify the requestor that no approver was identified, and then to the NotifyRejection activity 225. After the requester has been notified of the rejection, the workflow is terminated at the end requisition workflow activity 230.

To execute the CheckInventory activity 240, a computer-maintained inventory is queried to determine whether the requisitioned item is in stock. If so, the workflow transitions to a NotifyFilled activity 245 to notify the requestor that the requisition has been filled, then the workflow is ended at the EndRequisitionWorkflow activity 230. Similarly, if the requisitioned item is not in stock, a NotifyBackOrdered activity 245 is executed to notify the requester that the requisitioned item has been back-ordered, then the workflow is ended at the EndRequisitionWorkflow activity 230. Like the StartRequisitionWorkflow activity 205, the EndRequisitionWorkflow activity 230 is essentially a place holder used to indicate the end of the Requisition workflow 200 to the workflow engine.

Since a requisition workflow is a workflow that can be used in some form or another by almost any enterprise, the developer of the workflow program may choose to include seed data defining a generalized requisition process, like the one shown in FIG. 2. Depending on the workflow, the developer might wish to protect certain of the activities from modification, while permitting modification of others. The protected activities are said to be private to the developer in its role as seed data supplier. The unprotected, modifiable activities are considered to be public, at least from the perspective of the seed data supplier, since they can be modified by at least the immediate seed data consumer.

As stated above, a seed data consumer may itself be a seed data supplier to other seed data consumers and so may want to make private certain seed data that would otherwise be modifiable by the next level of seed data consumers in the software delivery path. In the present invention, this hierarchical protection of seed data is accomplished by assigning each seed data user (supplier or consumer) an access level. Subsets of seed data values within an overall seed data set are then assigned respective protection levels so that only a seed data user having an access level superior or equal to the protection level is able to modify the corresponding seed data subset. The granularity of the seed data subset having a corresponding seed data protection level may be as fine as a single seed data value. In the context of a workflow program, it is desirable to assign at least one protection level to the seed data definition of each workflow activity.

Protection and Customization Levels

FIG. 3 is a protection level table 300 indicating respective protection levels and customization levels for activities included in the workflow depicted in FIG. 2. Customization levels are discussed in greater detail below. For brevity, protection level table 300 includes entries for only three of the workflow 200 activities: CanRequestorApprove, SelectApprover and RequestApproval. As discussed above, the protection level is a value indicating a threshold access level required to modify the corresponding activity definition. That is, to modify seed data having a corresponding protection level, a user must have an access level that is equal or superior to the protection level. The user's access level may be determined any number of ways including by reading a previously set environment variable in the operating system or by embedding the access level in the program accessing the seed data.

It will be appreciated that while protection levels and customization levels may be kept in a relational database table, this is not necessary to practice the present invention. Protection levels and customization levels may also be maintained in a flat file, such as a binary or text file, and be associated with respective portions of a seed data entity (e.g., file or database table) by the arrangement of the protection level data in the flat file.

As shown in FIG. 3, the access level of the seed data supplier is zero. In one embodiment of the present invention, a lower numbered access level is superior to a higher numbered access level, with access level zero being the maximum superiority access level. Of course, an inverse scheme could be used wherein higher numbered access levels are superior to lower numbered access levels, but for the purpose of describing the present invention, lower valued superiority is assumed. The user access level ideally corresponds to the user's position in the seed data supplier/seed data consumer chain. For example, in the software delivery path of FIG. 1, the principals might have the following seed data access levels:

Program developer: 0
Enterprise MIS Dept.: 10
Sales Dept.: 100
Engineering Dept.: 110
Accounting Dept.: 120
Region 1 Sales Office: 200
Region 2 Sales Office: 210
Region 3 Sales Office: 220

By assigning access levels so that seed data consumers are always operating at a level inferior to that of their immediate seed data supplier, seed data suppliers are able to protect their customizations. This is discussed below in greater detail.

Seed Data Modification

Returning to FIG. 3, the developer, operating at access level zero, has set the protection level of the CanRequestorApprove activity to ten. This means that, in order for a subsequent user to be able to modify the seed data for the CanRequestorApprove activity, the user must be operating at an access level superior or equal to ten (i.e., an access level between zero and ten, inclusive).

The protection level of the seed data for the SelectApprover activity is set to infinity to indicate that a user operating at any access level can change the seed data for the SelectApprover activity. Finally, the protection level of the seed data for the RequestApproval activity is set to zero, indicating that the seed data cannot be modified except by a user operating at access level zero (e.g., the program developer). The seed data for the RequestApproval activity is said to be private to the program developer (or other user operating at access level zero), while the seed data for the CanRequestorApprove activity is private to users at access level ten and below. The seed data for the SelectApprover activity is public.

FIG. 4 illustrates a protection level table 400 resulting from the modification of the protection level table 300 of FIG. 3 by a user operating at access level ten (e.g., the enterprise MIS department described in reference to FIG. 1).

The access level ten user was unable to modify seed data defining the RequestApproval activity since the user's access level is inferior to the protection level for the RequestApproval seed data. However, since the user's access level is equal to the protection level of the seed data defining the CanRequestorApprove activity and superior to the protection level of the seed data defining the SelectApprover activity, the access level ten user is able to modify the seed data defining CanRequestorApprove and SelectApprover activities, including their protection level values. Consequently, the access level ten user might modify the CanRequestorApprove seed data, for example, to raise or lower the monetary value of the item that can be self-approved, and also to change the protection level of the seed data. In FIG. 4, the protection level of the seed data for the CanRequestorApprove activity has been changed to 100, and the protection level of the seed data defining the SelectApprover activity has been changed to 10.

In FIG. 4, the customization level of the seed data defining the SelectApprover and CanRequestorApprove activities is changed as a result of modification of the corresponding seed data by the access level ten user. The customization level indicates the access level of the last user to modify the seed data. Since the access level ten user has modified the seed data defining the SelectApprover and CanRequestorApprove activities, the customization level of the seed data defining those activities has been changed to ten. The advantage of maintaining the customization level in this manner is discussed below in reference to FIG. 6.

FIG. 4 illustrates a protection level table 500 resulting from the modification of the protection level table 400 of FIG. 4 by a user operating at access level one-hundred. The access level 100 user has modified the seed data defining the CanRequestorApprove activity. This access was made possible by access level ten user's relaxing of the protection level of the CanRequestorApprove seed data (described above in reference to FIG. 4). The customization level of the seed data defining the CanRequestorApprove activity is changed to one-hundred to reflect the seed data modification by the access level one-hundred user. The access level one-hundred user is not permitted to modify the seed data for either the SelectApprover or the RequestApproval activities.

Seed Data Upgrade

When program code is upgraded it is common to provide upgraded seed data as well. The seed data upgrade may be necessary to support new program options or to correct deficiencies in existing seed data. In the present invention, a seed data upgrade is assigned the access level of its producer; an access level referred to as an "upgrade access level". The upgrade access level is compared against existing seed data protection levels to confirm the authority of the seed data upgrade to overwrite existing seed data values. The upgrade access level is also compared against existing customization levels to determine whether existing customizations of seed data should be preserved.

FIG. 6 illustrates the manner in which customization levels are used to preserve valid seed data customizations during a program upgrade. Protection table 605 has been generated by a user operating at access level zero. This would be the case, for example, if the developer released a new version of a previously released program and has supplied a seed data upgrade with the new program version. In the example of FIG. 6, the protection level table 605 includes an entry for a new activity named VerifyApproval to be included in the requisition workflow and having seed data protection level one-hundred. All other entries in the protection level table 605 are as shown in FIG. 3.

Protection level table 630 is the protection level table resulting from the seed data modification discussed in reference to FIG. 5, and is to be upgraded by the contents of protection level table 605.

In one embodiment of the present invention, a two-part test is used to determine whether seed data is to be upgraded. Seed data is upgraded if (1) the upgrade access level is superior or equal to the protection level of the existing seed data, and (2) the upgrade access level is inferior or equal to the customization level of the existing seed data. By modifying seed data only if both prongs of this two-part test are satisfied, valid seed data customizations entered by seed data consumers are not overwritten in the upgrade.

Table 650 is the table resulting from the upgrade of seed data corresponding to protection level table 630. The two-part seed data upgrade test is applied for each upgrade listed in the upgrade protection level table 605, starting with the CanRequestorApprove activity. The upgrade access level (zero) is superior to the protection level of the seed data defining the CanRequestorApprove activity (ten), so that, as long as a valid customization will not be overwritten, the seed data for the CanRequestorApprove activity may be modified in the upgrade. However, the upgrade access level (zero) is not inferior or equal to the customization level of the seed data defining the CanRequestorApprove activity (one-hundred), indicating that a valid customization will be overwritten if the upgrade is permitted. Consequently, the seed data defining the CanRequestorApprove activity is not upgraded and the protection level of the CanRequestorApprove seed data remains at one-hundred. For the same reason, the protection level of the SelectApprover seed data is not changed to infinity as indicated in upgrade table 605, and instead remains at ten as set by the level ten user (discussed above in reference to FIG. 4). On the other hand, the protection level of the RequestApproval seed data is changed from zero in protection level table 630, to ten as indicated in the upgrade table 605. This is because both of the conditions necessary to upgrade the seed data, including the protection level value, are satisfied. The access level of the upgrade (zero) is superior or equal to the protection level of the seed data (zero), and the access level of the upgrade (zero) is inferior or equal to the customization level of the upgrade (zero). Thus, the seed data defining the RequestApproval activity can be modified in the upgrade.

Seed Data Modification Tool

Figure 7:
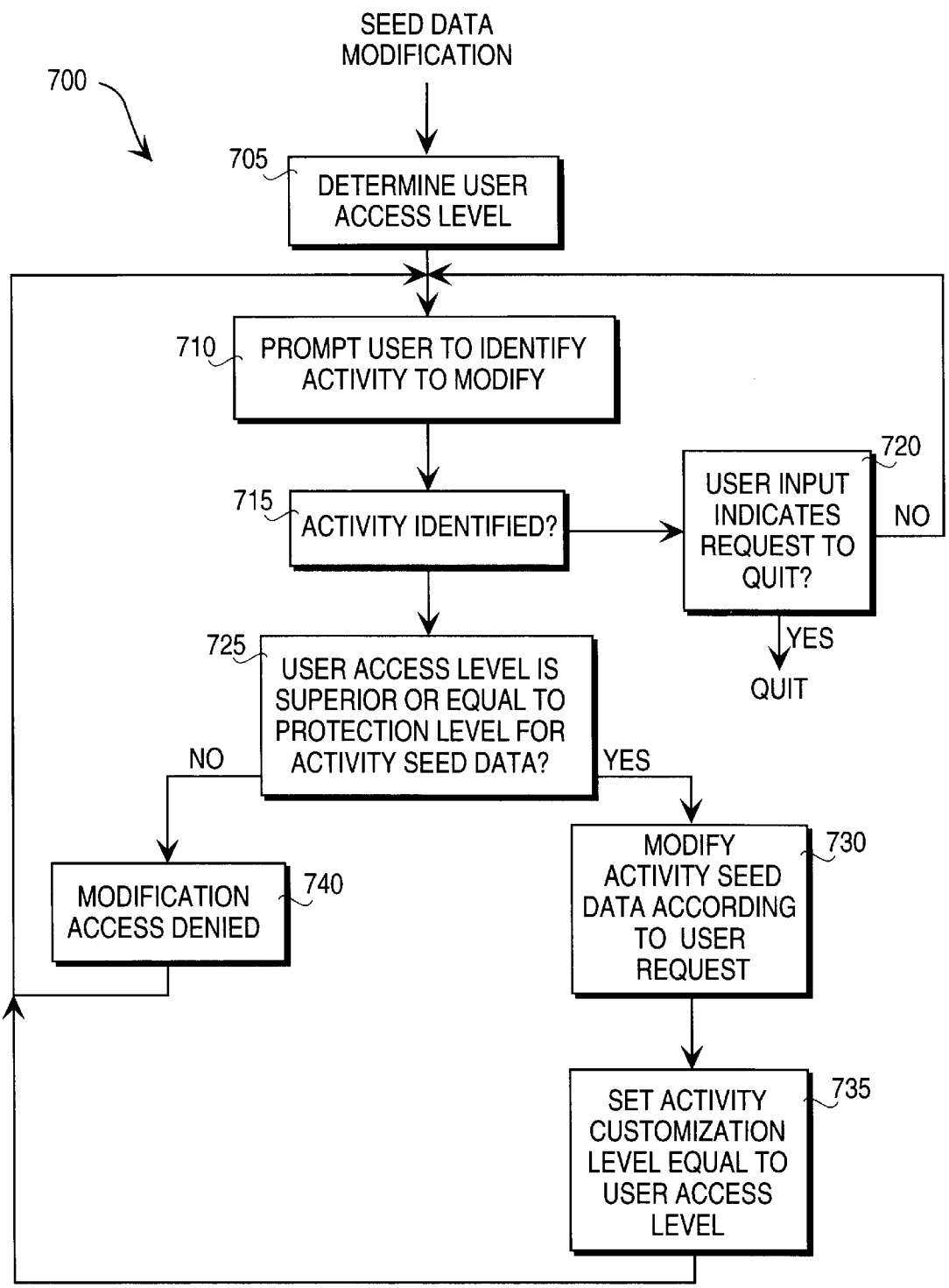
FIG. 7 is an execution diagram of a tool for modifying seed data according to the present invention.

FIG. 7 illustrates an execution diagram of a tool for modifying seed data according to the present invention. The tool for modifying seed data may be embodied in stand-alone program or may be included in the application program to which the seed data pertains. At step 705 the access level of the user (i.e., the "user access level") is determined. At step 710, the user is prompted to identify an activity whose seed data is to be modified. At decision step 715, the user input is inspected to determine if it identifies the seed data of an activity. If not, then at step 720, the user-input is further inspected to determine whether the user has requested to quit the seed data modification tool. If so, the seed data modification tool is exited. If the user-input does not indicate a request to quit the seed data modification tool, execution loops back to step 710 to again prompt the user to identify an activity whose seed data is to be modified.

Returning to decision step 715, if an activity has been identified, then at decision step 725, the user access level is compared against the seed data protection level. If the user access level is superior or equal to the seed data protection level, the activity seed data is modified according to user request at step 730. Then, at step 735, the customization level of the seed data defining the identified activity is set to the user access level. After the customization level has been set, execution of the seed data modification tool loops back to step 710 to prompt the user to identify the next activity to be modified.

If, at decision step 725, the user access level is determined not to be superior or equal to the seed data protection level, the user request to modify the activity seed data is denied at step 740 and execution is looped back to step 710 to prompt the user to identify another activity to be modified.

Seed Data Upgrade Tool

Figure 8:
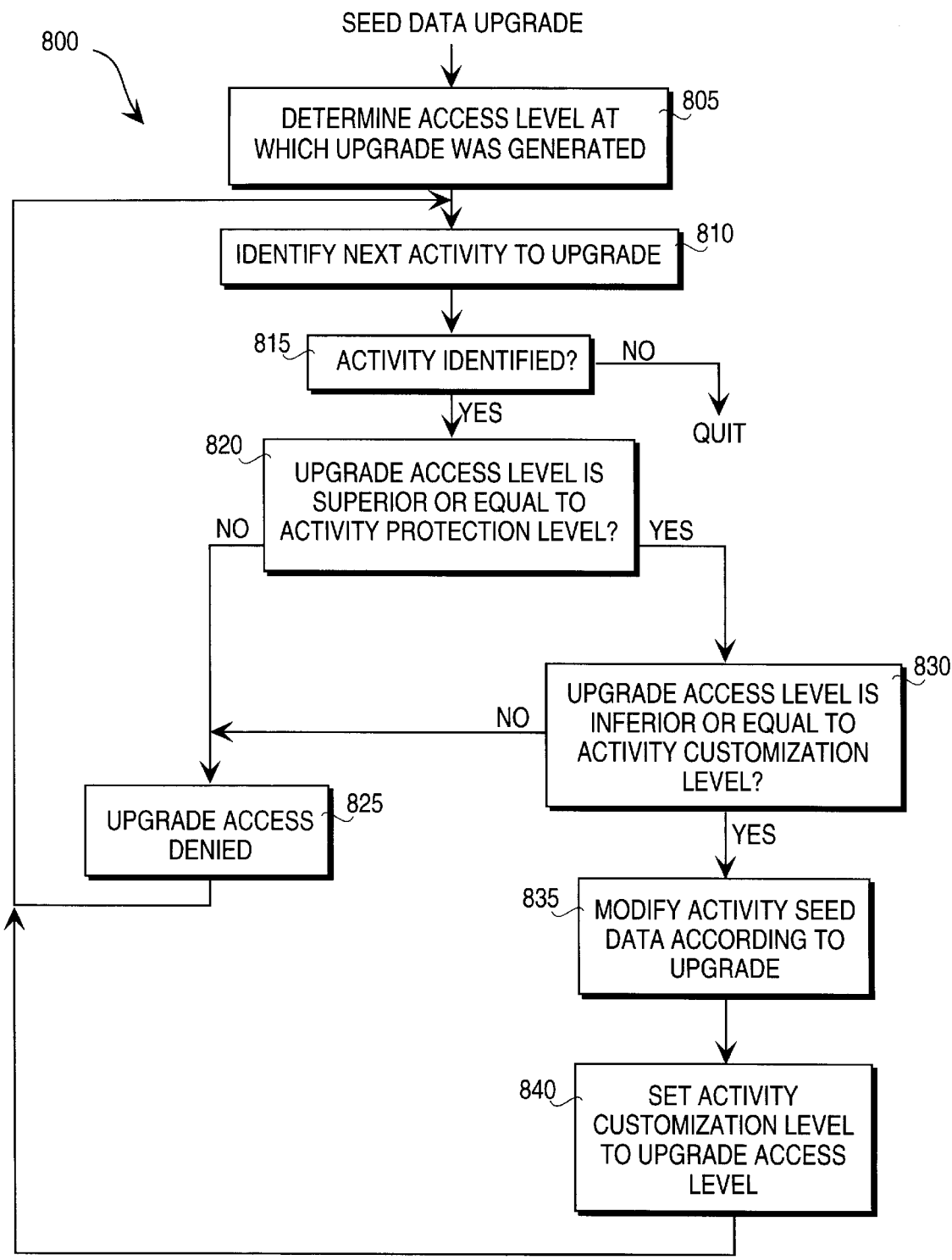
FIG. 8 is an execution diagram of a tool for upgrading seed data according to the present invention.

FIG. 8 illustrates an execution diagram of a tool for upgrading seed data according to the present invention. Like the seed data modification tool, the tool for upgrading seed data may be embodied in stand-alone program or may be included in the application program to which the seed data pertains.

At step 805, the access level at which the seed data upgrade was generated (i.e., the "upgrade access level") is determined. The upgrade access level is typically embedded in the flat file, or included with the set of database entries, containing the upgraded seed data. At step 810, the first activity to be upgraded is identified. If no activity is identified at step 810, then at decision step 815, the upgrade tool is exited. If an activity is identified in step 810, then, at decision step 820, the protection level of the seed data defining the activity to be upgraded is compared against the upgrade access level. If the upgrade access level is not superior or equal to the activity protection level, upgrade access is denied at step 825 and execution loops back to step 810 to identify the next activity whose seed data is to be upgraded. If, at decision step 820, the upgrade access level is determined to be superior or equal to the activity seed data protection level, then the upgrade access level is compared against the activity seed data customization level at decision step 830. If the upgrade access level is inferior or equal to the activity customization level, then the activity seed data is modified according to the upgrade at step 835. After the activity seed data has been modified at step 835, the seed data customization level is set to the upgrade access level at step 840. Execution then loops back to step 810 to identify the next activity to be upgraded. If, at decision step 830, the upgrade access level is determined not to be inferior or equal to the seed data customization level, then upgrade access is denied at step 825 and execution of the seed data upgrade tool loops back to step 810.

Computer System Overview

Figure 9:
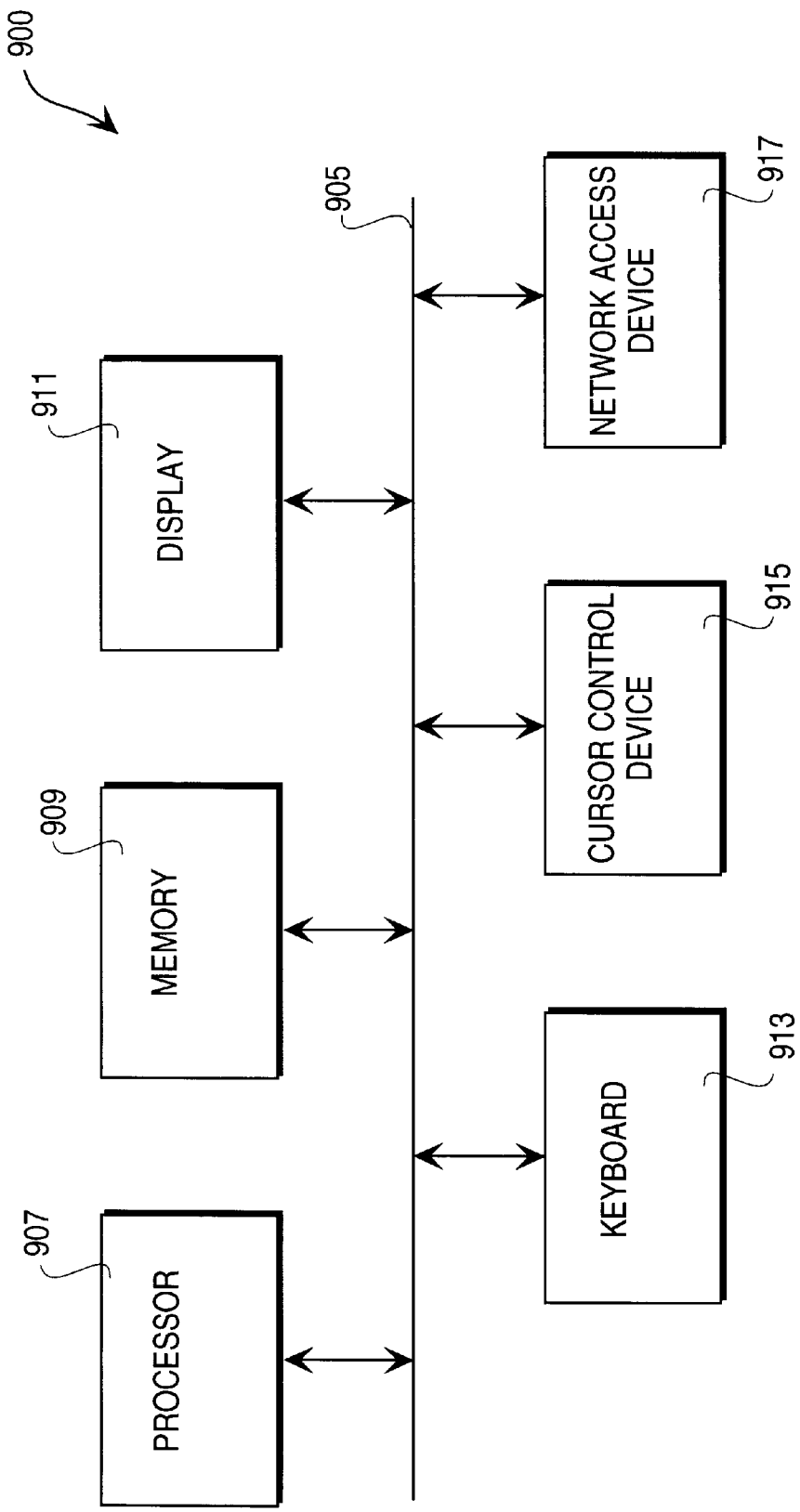
FIG. 9 is an architecture diagram of a computer system for performing the method steps of the present invention.

FIG. 9 depicts a block diagram of a general purpose computer system 900 for performing the individual steps of the method of the present invention. The computer system 900 includes a processor 907, memory 909, display device 911, keyboard 913, cursor control device 915, and computer network access device 917 each coupled to a bus 905. Although not individually shown, bus 905 typically includes an address bus, data bus and control bus. Cursor control device 915 may be a mouse, trackball, pen or any other device for manipulating a cursor on display device 911. Both the cursor control device 915 and the keyboard 913 enable the computer system 900 to receive input from a computer-user. Network access device 917 may be a modem, network adapter card or any other device for coupling computer 900 to a computer network.

Memory 909 may include both system memory (e.g., random access memory) and non-volatile storage such as a semiconductor read-only-memory, hard disk-drive, floppy disk-drive, optical disk-drive or any other computer-readable medium. When power is applied to the computer system 900, program code defining an operating system is loaded from non-volatile storage into system memory by processor 907 or another device, such as a direct memory access controller (not shown), having access to memory 909. Sequences of instructions comprised by the operating system are then executed by processor 907 to load other computer programs and portions of computer programs into system memory from non-volatile storage. The present invention may be embodied in a sequence of instructions which can be stored in a computer-readable medium and executed by processor 907. It will be appreciated that both system memory and non-volatile storage may be used to effectuate a virtual memory. In that case, sequences of instructions defining a portion of the operating system or an application program may be kept in non-volatile storage and then moved to system memory when required for execution.

Having described a method for practicing the present invention, it should be noted that the individual steps therein may be performed by a general purpose processor programmed with instructions that cause the processor to perform the recited steps, specific hardware components that contain hard-wired logic for performing the recited steps, or any combination of programmed general purpose computer components and custom hardware components. Nothing disclosed herein should be construed as limiting the present invention to a single embodiment wherein the recited steps are performed by a specific combination of hardware components.

A method for protecting seed data according to an access hierarchy is thus described. While the present invention has been described in particular embodiments and through particular examples, the present invention should not be construed as limited by such embodiments and examples, but rather construed according to the following claims.

What is claimed is:

1. A method for protecting computer program configuration data according to an access hierarchy, said method comprising the computer-implemented steps of:
   receiving a request from a computer-user to modify computer program configuration data;
   determining an access level associated with the computer-user;
   determining protection levels corresponding to respective portions of the computer program configuration data; and
   comparing the access level to each of the protection levels; and
   modifying each respective portion of the computer program configuration data if the access level is superior or equal to the protection level corresponding to the respective portion of the computer program configuration data.

2. The method of claim 1 wherein said step of modifying each respective portion of the computer program configuration data if the access level is superior or equal to the protection level comprises the step of modifying one of the respective portions of the computer program configuration data if a numeric value representing the access level is less than or equal to a numeric value representing the protection level corresponding to the one of the respective portions of the computer program configuration data.

3. The method of claim 1 further comprising the step of storing the access level of the computer user to indicate a customization level of one of the respective portions of the program configuration data if the access level is superior or equal to the protection level corresponding to the one of the respective portions of the program configuration data.

4. The method of claim 1 wherein said step of determining an access level of the computer user comprises the step of inspecting a value stored in computer memory.

5. A method for protecting seed data according to an access hierarchy, said method comprising the computer-implemented steps of:
receiving a request to modify seed data;
determining an access level associated with the request;
determining a protection level of the seed data;
determining a customization level of the seed data; and
modifying the seed data according to the request if the access level is superior or equal to the protection level and inferior or equal to the customization level.

6. The method of claim 5 wherein said step of modifying the seed data if the access level is superior or equal to the protection level and inferior or equal to the customization level comprises the step of determining that a numeric value representing the access level is less than or equal to a numeric value representing the protection level and greater than or equal to a numeric value representing the customization level.

7. The method of claim 5 wherein said step of receiving a request to modify seed data comprises the step of receiving data to replace the seed data.

8. The method of claim 7 wherein said step of determining an access level associated with the request comprises the step of receiving a value representing the access level with the data to replace the seed data.

9. The method of claim 7 wherein said step of modifying the seed data comprises the step of replacing the seed data with the data received in the request to modify the seed data.

10. The method of claim 5 wherein said step of determining a protection level of the seed data comprises the step of inspecting a numeric value stored with the seed data.

11. A computer-readable medium having a plurality of sequences of instructions stored thereon which, when executed by a processor, cause said processor to protect seed data according to an access hierarchy, said plurality of sequences of instructions including sequences of instructions which, when executed by said processor, cause said processor to perform the steps of:
receiving a request to modify seed data;
determining an access level associated with the request;
determining a protection level of the seed data;
determining a customization level of the seed data; and
modifying the seed data according to the request if the access level is superior or equal to the protection level and inferior or equal to the customization level.

12. The computer readable medium of claim 11 wherein said step of modifying the seed data if the access level is superior or equal to the protection level and inferior or equal to the customization level comprises the step of determining that a numeric value representing the access level is less than or equal to a numeric value representing the protection level and greater than or equal to a numeric value representing the customization level.

13. The computer readable medium of claim 11 wherein said step of receiving a request to modify seed data comprises the step of receiving data to replace the seed data.

14. The computer readable medium of claim 11 wherein said step of determining an access level associated with the request comprises the step of receiving a value representing the access level with the data to replace the seed data.

15. The computer readable medium of claim 11 wherein said step of determining a protection level of the seed data comprises the step of inspecting a numeric value stored with the seed data.

16. A computer-readable medium having a plurality of sequences of instructions stored thereon which, when executed by a processor, cause said processor to protect computer program configuration data according to an access hierarchy, said plurality of sequences of instructions including sequences of instructions which, when executed by said processor, cause said processor to perform the steps of:
receiving a request from a computer-user to modify computer program configuration data;
determining an access level associated with the computer-user;
determining protection levels corresponding to respective portions of the computer program configuration data; and
comparing the access level to each of the protection levels; and
modifying each respective portion of the computer program configuration data if the access level is superior or equal to the protection level corresponding to the respective portion of the computer program configuration data.

17. The computer-readable medium of claim 16 wherein said step of determining an access level of the computer user comprises the step of inspecting a value stored in computer memory.

18. A computer data signal embodied in a carrier wave and encoding a plurality of sequences of instructions which, when executed by a processor, cause said processor to protect seed data according to an access hierarchy, said plurality of sequences of instructions including sequences of instructions which, when executed by said processor, cause said processor to perform the steps of:
receiving a request to modify seed data;
determining an access level associated with the request;
determining a protection level of the seed data;
determining a customization level of the seed data; and
modifying the seed data according to the request if the access level is superior or equal to the protection level and inferior or equal to the customization level.

19. The computer data signal of claim 18 wherein said step of determining a protection level of the seed data comprises the step of inspecting a numeric value stored with the seed data.

20. A computer comprising:
a processor;
a user-input device coupled to said processor; and a memory coupled to said processor and having stored therein seed data; and program code which, when executed by said processor, causes said processor to modify said seed data according to an access hierarchy, said program code including sequences of instructions which, when executed by said processor, causes said processor to perform the steps of:

receiving a request via said user-input device to modify said seed data;

determining an access level associated with said request;

determining a protection level associated with said seed data;

determining a customization level associated with said seed data; and modifying said seed data according to said request if said access level is superior or equal to said protection level and inferior or equal to said customization level.

* * * * *